United States Patent

Cen (10) Patent No.: US 9,442,979 B2
(45) Date of Patent: Sep. 13, 2016

(54) DATA ANALYSIS USING MULTIPLE SYSTEMS

(75) Inventor: Wenchu Cen, Hangzhou (CN)

(73) Assignee: Alibaba Group Holding Limited (KY)

(*) Notice: Subject to any disclaimer, the term of this patent is extended or adjusted under 35 U.S.C. 154(b) by 112 days.

(21) Appl. No.: 13/135,407

(22) Filed: Jul. 5, 2011

(65) Prior Publication Data

US 2012/0011121 A1    Jan. 12, 2012

(30) Foreign Application Priority Data

Jul. 7, 2010    (CN) .......................... 2010 1 0222602

(51) Int. Cl.
*G06F 17/30* (2006.01)

(52) U.S. Cl.
CPC .............................. *G06F 17/30445* (2013.01)

(58) Field of Classification Search
None
See application file for complete search history.

(56) References Cited

U.S. PATENT DOCUMENTS

| | | | |
|---|---|---|---|
| 5,802,511 A | 9/1998 | Kouchi et al. | |
| 6,098,111 A | 8/2000 | Maegawa et al. | |
| 6,434,544 B1 | 8/2002 | Bakalash et al. | |
| 6,714,979 B1* | 3/2004 | Brandt et al. ................. | 709/225 |
| 7,047,232 B1 | 5/2006 | Serrano | |
| 7,047,252 B2 | 5/2006 | Buch et al. | |
| 7,571,151 B1 | 8/2009 | Fontaine | |
| 7,610,306 B2* | 10/2009 | Lin et al. | |
| 7,624,118 B2 | 11/2009 | Schipunov et al. | |
| 7,797,333 B1* | 9/2010 | Chapman et al. ............ | 707/770 |
| 2002/0152215 A1* | 10/2002 | Clark et al. ..................... | 707/10 |
| 2003/0131215 A1* | 7/2003 | Bellew ........................... | 712/200 |
| 2004/0024770 A1* | 2/2004 | Cardno .......................... | 707/100 |
| 2004/0098425 A1* | 5/2004 | Wiss et al. .................... | 707/204 |
| 2006/0010119 A1* | 1/2006 | Jonas .................................. | 707/3 |
| 2007/0038664 A1* | 2/2007 | Jonas ........................... | 707/102 |
| 2007/0118491 A1 | 5/2007 | Baum et al. | |
| 2008/0059392 A1 | 3/2008 | Barnhill et al. | |
| 2008/0177702 A1* | 7/2008 | Morgan .......................... | 707/3 |
| 2008/0233576 A1 | 9/2008 | Weston et al. | |
| 2009/0089560 A1 | 4/2009 | Liu et al. | |
| 2009/0138455 A1* | 5/2009 | Copello ........................... | 707/4 |
| 2011/0179100 A1 | 7/2011 | Kawai | |

FOREIGN PATENT DOCUMENTS

| | | |
|---|---|---|
| JP | H052610 | 1/1993 |
| JP | H07302267 | 11/1995 |
| JP | 2001109718 | 4/2001 |

OTHER PUBLICATIONS

Ohta et al. "Complete Introduction to Hadoop" Japan, Shoeisha Co. Ltd, Jan. 27, 2011, First Edition, pp. 19, 20, 124-130, 166-174.

* cited by examiner

Primary Examiner — Charles Adams

(74) Attorney, Agent, or Firm — Van Pelt, Yi & James LLP (57) ABSTRACT

Data analysis is disclosed, including: receiving data to be analyzed, wherein the data includes one or more data identifiers (IDs) and one or more preset key-value pairs, wherein each preset key-value pair includes a preset key and a preset value; acquiring data to be analyzed based at least in part on the data IDs; segmenting the acquired data into one or more data elements; classifying the one or more data elements based at least in part on one preset key of the one or more preset key-value pairs; and analyzing the classified one or more data elements based at least in part on one preset value of the one or more preset key-value pairs.

17 Claims, 7 Drawing Sheets

DATA ANALYSIS USING MULTIPLE SYSTEMS

CROSS REFERENCE TO OTHER APPLICATIONS

This application claims priority to People's Republic of China Patent Application No. 201010222602.3 entitled METHOD, SYSTEM AND SERVER FOR DATA ANALYSIS filed Jul. 7, 2010 which is incorporated herein by reference for all purposes.

FIELD OF THE INVENTION

The present invention relates to the field of computer data processing.

BACKGROUND OF THE INVENTION

As Web 2.0 technology has developed, the volume of Internet applications and operational data (e.g., subscriber action data and platform system data) in Internet platforms has grown tremendously. To facilitate the processing of massive quantities of operational data, a parallel data-processing architecture is typically used. That is, the processing of massive quantities of data is accomplished through the joint collaboration of multiple distributed computers.

Typically, in large Internet website platforms, the most widely used parallel data processing architecture is the Hadoop system architecture. The Hadoop system architecture includes a cluster of systems composed of a master server and multiple slave servers. The master server divides the massive data into multiple data blocks and then allocates the divided data blocks to the multiple slave servers that operate in parallel. Each slave server processes its data block and sends the processing results to the master server. After merging the processing results, the master server then outputs the merged processing results. In addition, the merged results output from the master server in one stage of processing may also serve as the input for data processing in the next stage to obtain the next-stage merged results. Such a combination of parallel and serial processing enables the parallel data processing system to process massive quantities of data with a high degree of efficiency.

Such conventional techniques of analyzing data are primarily based on relational databases. However, it is very difficult to use relational databases to analyze massive quantities of data in a parallel data processing architecture. It is particularly difficult to meet demands when it is necessary to perform complex data analysis such as classification and report generation.

BRIEF DESCRIPTION OF THE DRAWINGS

Various embodiments of the invention are disclosed in the following detailed description and the accompanying drawings.

In order to describe more clearly the technical schemes in the current art and the embodiments of the present application, the drawings needed to describe embodiments or the current art are explained briefly below. Obviously, the drawings described below are only some embodiments of the present application. A person with ordinary skill in the art could, without expending inventive effort, acquire other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analysis of massive quantities of data in a parallel data processing architecture is disclosed. In various embodiments, the parallel data processing architecture includes a Hadoop system architecture.

Figure 1A:
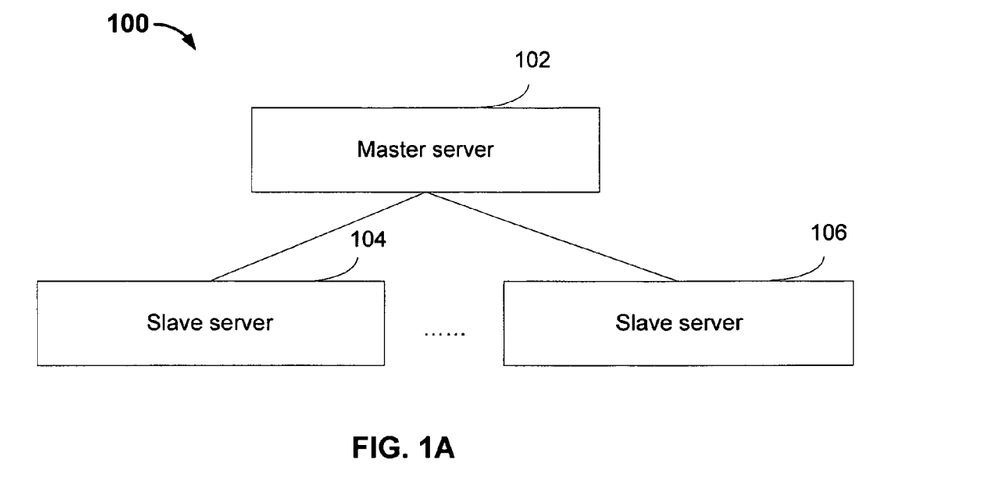
FIG. 1A is a diagram showing an embodiment of a system for data analysis, where the system includes a master server and at least two slave servers.

FIG. 1A is a diagram showing an embodiment of a system for data analysis, where the system includes a master server and at least two slave servers. In the example, system 100 includes: master server 102 and at least two slave servers 104 and 106. Although only two slave servers are shown in the example, system 100 can include more than two slave servers. In various embodiments, master server 102 is connected to either or both of slave server 104 and 106 over a network (not shown) that can include, for example, a high speed data and/or telecommunications network.

Master server 102 is configured to send data to be analyzed (e.g., files) to slave servers 104 and 106. Preferably, master server 102 allocates different portions of a set of data among multiple slave servers (e.g., 104 and 106). However, in some embodiments, master server 102 allocates at least some of the same portions of a set of data to multiple slave servers so that each slave server could perform a different function with the data that it receives. In some embodiments, the data to be analyzed includes one or more data identifiers (IDs) and one or more preset key-value pairs, wherein each preset key-value pair includes a preset key and a preset value. In some embodiments, a preset key defines the manner in which a slave server classifies the data to be analyzed. In some embodiments, a preset value defines the manner in which a slave server is to analyze and process the classified data. Master server 102 is also configured to receive and merge analysis results from slave servers 104 and 106. In some embodiments, after master server 102 merges analysis results received one or more slave servers, master server 102 is configured to compare the merged analysis results to historical merged analysis results and to generate a warning if a condition is met by the comparison.

Slave servers 104 and 106 are configured to receive data to be analyzed from master server 102. Slave servers 104 and 106 are configured to use the data IDs and preset key-value pairs to acquire raw data, classify the raw data and analyze the classified raw data. Slave servers 104 and 106 are configured to send analysis results to master server 102. Further details regarding a slave server's functions are described below.

Figure 1B:
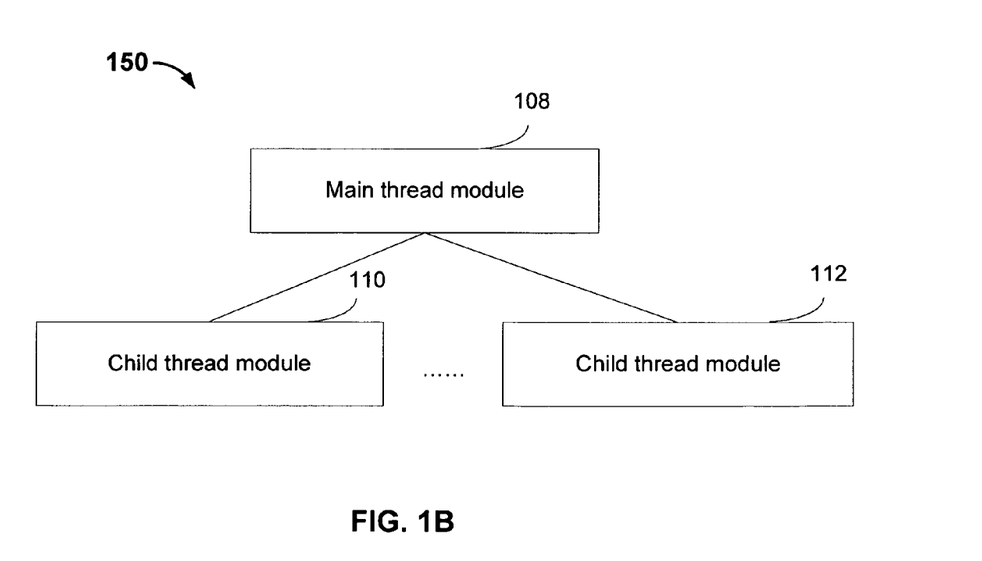
FIG. 1B is diagram showing an embodiment of a system for data analysis, where the system includes a main thread module and at least two child thread modules.

FIG. 1B is diagram showing an embodiment of a system for data analysis, where the system includes a main thread module and at least two child thread modules. In the example, system 150 includes: main thread 108 and at least two child thread modules 110 and 112. Although only two child thread modules are shown in the example, system 150 can include more than two child thread modules.

In some embodiments, main thread module 108, child thread module 110, and child thread module 112 can be implemented on one device. In the event that main thread module 108 and child thread modules 110 and 112 are implemented on one device, child thread modules 110 and 112 need not use a network to communicate with main thread module 108 and can instead just use communication processes that are internal to the device. In some embodiments, main thread module 108 performs functions similar to those of master server 102 and child thread modules 110 and 112 perform functions similar to those of slave servers 104 and 106.

Figure 2:
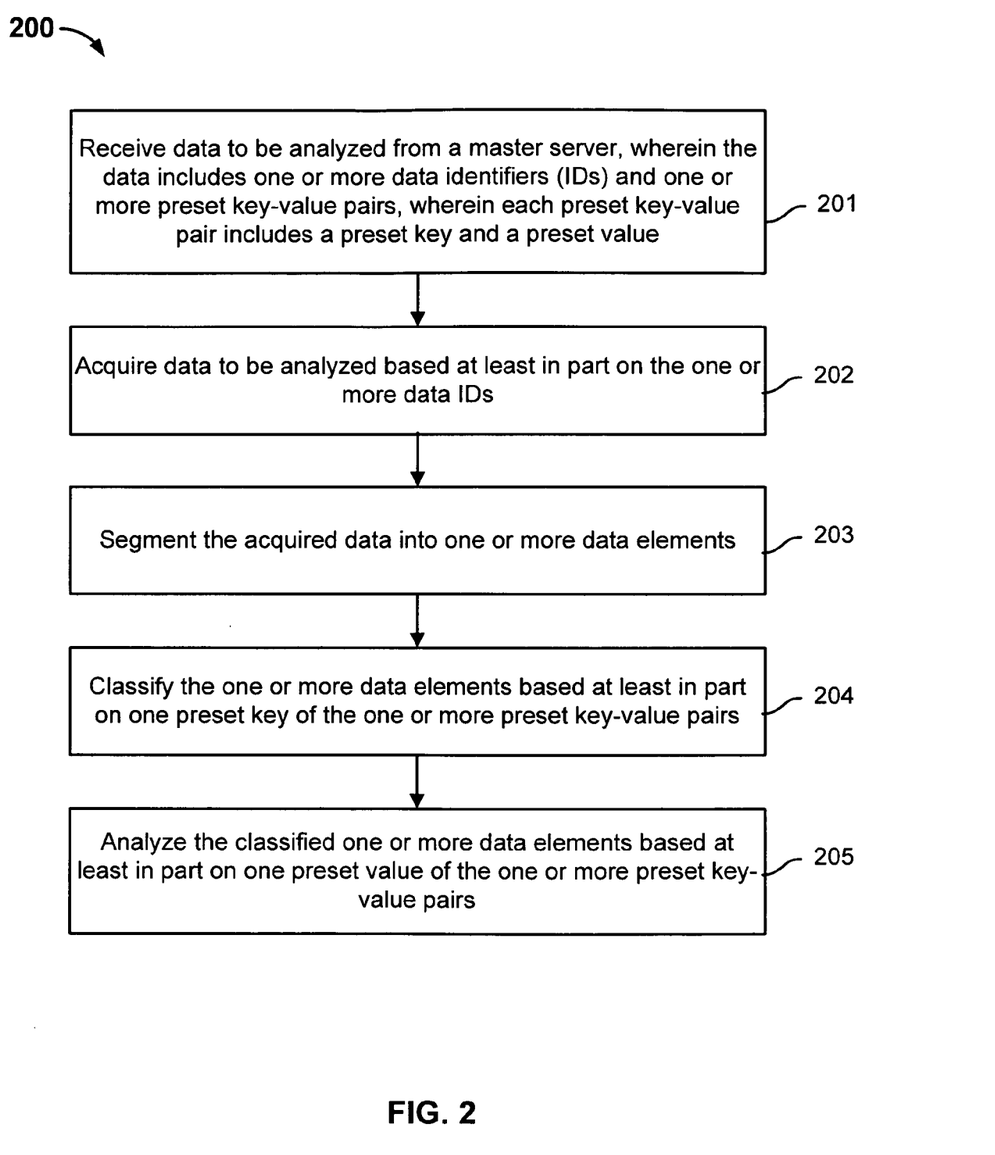
FIG. 2 is a flow diagram showing an embodiment of a process for data analysis.

FIG. 2 is a flow diagram showing an embodiment of a process for data analysis. In some embodiments, process 200 can be implemented, at least in part, using system 100.

At 201: data to be analyzed is received from a master server, wherein the data to be analyzed includes one or more data identifiers (IDs) and one or more preset key-value pairs, wherein each preset key-value pair includes a preset key and a preset value. In various embodiments, data to be analyzed is received at a slave server. In some embodiments, the data includes files. In some embodiments, a preset key defines the manner in which a slave server is to classify the data to be analyzed. In some embodiments, a preset value defines the manner in which a slave server is to analyze and process the classified data.

For example, in a parallel data processing architecture, the master server sends a set of (e.g., different) files to each associated slave server. The file includes a data ID and one or more preset key-value pairs. The data ID in the file indicates the pre-analysis raw data that the recipient slave server needs to acquire (e.g., from some form of storage). For example, data address information (e.g., related to the associated storage) may serve as the data ID that identifies the raw data that the recipient slave server is to acquire and analyze. A preset key-value pair includes a preset key and a preset value. The preset key defines the manner in which the slave server classifies the raw data that it is going to analyze. The preset value defines the manner in which the slave server is to analyze the raw data after it has been classified using the preset key.

For example, a preset key-value pair is as follows: "key=1, 2, 3" (where 1, 2, and 3 represent the first three positions of values within a sequence of data elements) and "value=max ($a$+$b$+$c$)." In the example, the definition of the preset key requires that the recipient slave server classify the pre-analysis data that have the same values corresponding to the data elements in the first three positions of the data sequences (sometimes referred to as sets of data) into one group. Then, based on the preset value definition, the slave server is to analyze the data classified into the group by adding the values corresponding to positions a, b, and c for each data sequence within the classified group and then choosing the sum that is the maximum. The chosen value is the analysis result.

In some embodiments, the preset value definition indicates a function to be performed on the data that is classified based on the preset key. In some embodiments, the preset value definition can include one or more of the following: finding the minimum value (min), finding the maximum value (max), calculating the mean (average), counting (count), summing (sum), and directly displaying (plain). In some embodiments, directly displaying (plain) is used to display the value(s). Other functions can be indicated by the preset value definition besides only those discussed above.

At 202: data to be analyzed is acquired based at least in part on the one or more data IDs. In some embodiments, the slave server acquires the raw data that is to be analyzed from a data source based on the received data IDs. In some embodiments, the data elements included within the acquired data are segregated by partition IDs.

For example, each slave server obtains the pre-analysis raw data as indicated by the data ID from a data source. For example, the data source could be a FTP server, a database (DB), or a file system. The specific data format could be, for example, a data table, a record, a log, etc. In addition, the data elements within the raw data are segregated or delimited by partition IDs. The partition IDs could be, for example, commas, semicolons, colons, etc. For exemplary purposes, commas are used herein to represent partition IDs between data elements.

For example, the following are two sets (or sequences of) raw data acquired from a data source. In the example, the raw data was extracted from a log-type of data format. In this log extract, every data element is segregated from another data element by a comma. Moreover, this log extract contains a total of two sets of raw data, with a carriage return serving as the end of each set of data.

0, 203.171.227.117, null, xml, 12005554, taobao.user.get, 0, 0, 0, 172.24.14.65, Xiao Guo cc, 1.0, null, 3, null, 0, 1274803197776, 0, 0, 0, 1, 0, 0, 0, 0, 8, 0, 0, 0, 9

0, 97.74.215.111, null, xml, 12028711, taobao.taobaoke.items.detail.get, 0, 0, null, 172.24.14.65, null, 2.0, md5, 4, null, 221000, 1274803197765, 0, 2, −1, 1, 0, 0, 0, 0, 23, 0, 0, 0, 26

At 203: the acquired data is segmented into one or more data elements. In some embodiments, a slave server segments the acquired raw data into data elements based on the partitioned IDs.

Using the previous example, if the data elements are segregated by the partition IDs of commas, then the first set of data can be segmented at the commas to form a total of 30 data elements: The first data element is "0"; the second data element is "203.171.227.117"; the third data element is "null"; the fourth data element is "xml"; the fifth data element is "12005554"; the sixth data element is "taobao.user.get", . . . , and the 30th data element is "9".

The second set of data can likewise be segmented into 30 data elements in a similar way as described above.

At 204: the one or more data elements are classified based at least in part on one preset key of the one or more preset key-value pairs.

For example, if a preset key in one of the preset key-value pairs is: "key=1, 2, 3", then the data elements referred to by the preset key are those in the first three positions of a set of data (after the set of data has been segmented at the partition IDs). Using the previous example, the segmented data elements are the data elements in positions 1 through 3: "0," "203.171.227.117," and "null."

For example, assume that the preset key is "key=1, 2, 3" and the preset value is "value=max ($a$+$b$+$c$)." In this example, assume that there are 10 sets of pre-analysis raw data. Classifying the 10 sets of raw data based on the preset key "key=1, 2, 3," includes sorting the sets of data with the same data elements at positions 1, 2, and 3 into one group. After the sorting, it is found that 7 of the 10 sets of pre-analysis data share the same data elements in positions 1 through 3 (e.g., these 7 sets of data are sorted into one group) and that the other 3 sets of raw data share the same data elements in positions 1 through 3 (e.g., these 3 sets of data are sorted into a second group). Thus, the sums of the data elements in positions a, b and c (positions a, b, and c may or may not be the same as positions 1, 2, and 3) are calculated for each of the 7 sets of raw data in the one group, and then the maximum value among the calculated sums is returned. Similarly, the sums of the data elements at positions a, b and c are calculated for each of the 3 sets of raw data in the second group, and then the maximum value among calculated the sums is returned.

However, when a record includes a large amount of data, or when the sequence of data elements within the raw data changes, it is easy for the data elements to be processed incorrectly. The sequence of data elements within a set of raw data can change when, for example, a new data element (e.g., that corresponds to the alias of "responseMappingTime") is added into the sequence. The new data element could be inserted at any position within the sequence and thus, change the sequence of at least some of the data elements that were already part of the sequence. In some embodiments, when the sequence of data elements within a set of raw data changes, the definitions of the corresponding preset keys need to change accordingly. Take a data element "0" whose corresponding preset key definition is key="1" (e.g., the preset key of 1 denotes that the position within the raw data sequence as being the first) as an example, when it is moved one position to the right in the raw data sequence, the definition of its corresponding preset key becomes key="2". If, at this point, one wants to refer to the data element "0", it becomes necessary to revise the definition of the preset key in the preset key-value pair. That is, "key=1" should be revised to "key=2". If it is not revised, the wrong data element will be referred to by the slave server. In some embodiments, to ensure that the definition of the preset key in the preset key-value pair does not need to be revised when the data element is shifted to a new position within the data element sequence is to establish an alias for each data element. The following is an example of a definition of each data element within a sequence and its corresponding alias.

```
<aliases>
    <alias name="appStatus" key="1"/>
    <alias name="remoteIp" key="2"/>
    <alias name="partnerId" key="3"/>
    <alias name="format" key="4"/>
    <alias name="appKey" key="5"/>
    <alias name="apiName" key="6"/>
    <alias name="readBytes" key="7"/>
    <alias name="errorCode" key="8"/>
    <alias name="subErrorCode" key="9"/>
    <alias name="localIp" key="10"/>
    <alias name="nick" key="11"/>
    <alias name="version" key="12"/>
    <alias name="signMethod" key="13"/>
    <alias name="tag" key="14"/>
    <alias name="id" key="15"/>
    <alias name="responseMappingTime" key="16"/>
    <alias name="timestamp0" key="17"/>
    <alias name="timestamp1" key="18"/>
    <alias name="timestamp2" key="19"/>
    <alias name="timestamp3" key="20"/>
    <alias name="timestamp4" key="21"/>
    <alias name="timestamp5" key="22"/>
    <alias name="timestamp6" key="23"/>
    <alias name="timestamp7" key="24"/>
    <alias name="timestamp8" key="25"/>
    <alias name="timestamp9" key="26"/>
    <alias name="timestamp10" key="27"/>
    <alias name="timestamp11" key="28"/>
    <alias name="timestamp12" key="29"/>
    <alias name="timestamp13" key="30"/>
</aliases>
```

As shown in the above example, the alias of the first data element in a set of data is "appStatus," the alias of the second data element is "remoteIp," and so on. In some embodiments, once the alias definitions are used, the preset keys defined in the preset key-value pairs above are accordingly replaced by the appropriate defined aliases: key="appStatus, remoteIp, partnerId." So, even if the first data element "0" is shifted one position to the right, its position in the record sequence will change, but its alias will remain as "appStatus" (whereas if the alias were not used, then the corresponding preset key of "1" would be incorrect after the shift). Thus, when alias definitions are used, it becomes unnecessary to revise the definition of the preset key in the preset key-value pair in the event that the corresponding data element is shifted within the data sequence.

At 205: the classified one or more data elements are analyzed based at least in part on one preset value of the one or more preset key-value pairs. In some embodiments, the classified one or more data elements are analyzed by the slave server. In some embodiments, the results of the analysis are sent to the master server. In some embodiments, the master server collects analysis results from more than one slave server. In some embodiments, the master server can merge and/or carry out further analysis on the analysis results collected from one or more slave servers.

For example, assume that the preset key (using an alias definition) defined in the preset key-value pair is "key=version,apiName,format" and that the defined preset value is "value=average ($responseMappingTime$)". The slave server, based on the preset key definition, classifies the subset of acquired raw data sets whose values that correspond to the data elements "version," "apiName" and "format" are the same into a group. The slave server, based on the preset value definition, finds the average of the values corresponding to the data element "responseMappingTime" from the sets of data in the group.

The following are examples of definitions of preset key-value pairs, where each includes a preset key and a corresponding preset value:

```
<entryList>
    <entry name="service name" key="version,apiName,format"
value="plain ($apiName$)"/>
    <entry name="version number" key="version,apiName,format"
value="plain ($version$)"/>
    <entry name="return format" key="version,apiName,format"
value="plain ($format$)"/>
    <entry name="Mapping time" key="version,apiName,format"
value="average ($responseMappingTime$)"/>
    <entry name="Mapping time maximum"
key="version,apiName,format" value="max ($responseMappingTime$)"/>
    <entry name="mean task time expended (ms)"
key="version,apiName,format" value="average ($timestamp9$)"/>
    <entry name="processing total" key="version,apiName,format"
value="count ( )"/>
</entryList>
```

In the first example preset key-value pair, the preset key definition indicates for the slave server to classify raw data sets that include the same values for the data elements of "version," "apiName," and "format" into one group. The preset value definition indicates for the slave server to display the value of the data element "apiName" for each set of the data included in the group.

In the second example preset key-value pair, the preset key definition indicates for the slave server to classify raw data sets that include the same values for the data elements of "version," "apiName," and "format" into one group. The preset value definition indicates for the slave server to display the value of the data element "version" for each set of the data included in the group.

In the third example key-value pair, the preset key definition indicates for the slave server to classify raw data sets that include the same values for the data elements of "version," "apiName," and "format" into one group. The preset value definition indicates for the slave server to display the value of the data element "format" for each set of the data included in the group.

In the fourth example preset key-value pair, the preset key definition indicates for the slave server to classify raw data sets that include the same values for the data elements of "version," "apiName," and "format" into one group. The preset value definition indicates for the slave server to calculate the mean of the values corresponding to the data element "responseMappingTime" for the sets of data included in the group.

In the fifth example preset key-value pair, the preset key definition indicates for the slave server to classify raw data sets that include the same values for the data elements of "version," "apiName," and "format" into one group. The preset value definition indicates for the slave server to calculate the maximum of the values corresponding to the data element "responseMappingTime" for the sets of data included in the group.

In the sixth example preset key-value pair, the preset key definition indicates for the slave server to classify raw data sets that include the same values for the data elements of "version," "apiName," and "format" into one group. The preset value definition indicates for the slave server to calculate the mean of the values corresponding to the data element "timestamp9" for the sets of data included in the group.

In the seventh example preset key-value pair, the preset key definition indicates for the slave server to classify raw data sets that include the same values for the data elements of "version," "apiName," and "format" into one group. The preset value definition indicates for the slave server to count the number of classified raw data sets included in the group In addition, the seven example key-value pairs described above also indicate the display names (e.g., "entry names") of the analysis results, e.g., "service name," "version number," "return format," "Mapping time," "Mapping time maximum," "mean task time expended (ms)" and "processing total."

The following is an example of data returned from a data analysis using preset key-value pairs as described above.

| Service name | Version no. | Return format | Mapping time | Mapping time maximum | Mean task time expended (ms) | Processing total |
|---|---|---|---|---|---|---|
| taobao.areas.get | 1 | xml | 0 | 0 | 88.73333 | 15 |
| taobao.delivery.send | 1 | json | 0 | 0 | 417.2395 | 3561 |
| taobao.delivery.send | 1 | xml | 0 | 0 | 423.9512 | 1210 |
| taobao.fenxiao.alipay.user.get | 1 | json | 0 | 0 | 128.5 | 10 |
| taobao.fenxiao.delivery.send | 1 | json | 0 | 0 | 306.25 | 16 |
| taobao.fenxiao.distributor.add | 1 | json | 0 | 0 | 158.2 | 5 |
| taobao.fenxiao.supplier.punish | 1 | json | 0 | 0 | 13.5 | 4 |
| taobao.fenxiao.supplier.update | 1 | json | 0 | 0 | 7 | 1 |

In the example above, the first line of data (e.g., the row starting with "taobao.areas.get") indicates that classification is to be carried out based on a preset key including the data elements of "version," "apiName" and "format." The data sets are classified into a group based on the fact that the "service name," "version number" and "return format" (which correspond to "apiName," "version," and "return format") are "taobao.areas.get", "1" and "xml," respectively. The processing total (the preset value of "count( )") of the data sets that are included in this group is 15. Both mapping time and mapping time maximum (the preset value of "max ($responseMappingTime$)") for the data sets in this group are 0. The mean task time (the preset value of "average ($timestamp9$)") expended for the 15 data sets in the group is 88.73333 ms.

In some embodiments, after each slave server has analyzed and processed the raw data, it sends its analysis results back to the master server. The master server merges the analysis results received from one or more slave servers. In some embodiments, the master server can, using the definitions of the preset keys in the preset key-value pairs, classify the analysis results received from multiple slave servers (e.g., each slave server can be located at a different remote, physical location). In some embodiments, the master server then merges the classified analysis results. For example, a preset key (e.g., as configured by a system administrator for the master server) can indicate the manner in which the master server classifies and processes the analysis results and the preset value (e.g., as configured by a system administrator for the master server) can indicate the method by which the master server merges the analysis results. For example, a master server receives a total of 10 analysis results from 5 slave servers. Using a preset key definition, 7 sets of the analysis results can be classified together into one group (e.g., because the 7 sets of data have the same values corresponding to the data elements specified in the preset key), and another 3 sets of the analysis results can be classified together into a second group. Thus, the master server can, using the preset value definition, analyze the 7 sets of classified analysis results together, and it can, using the preset value definition, analyze the 3 sets of classified analysis results together.

In some embodiments, the techniques described above can apply to a setup that includes a main thread module and one or more child thread modules (e.g., system 150). In such a setup, a main thread module can realize the functions of the master server and the child thread modules can realize the functions of the slave servers.

Figure 3:
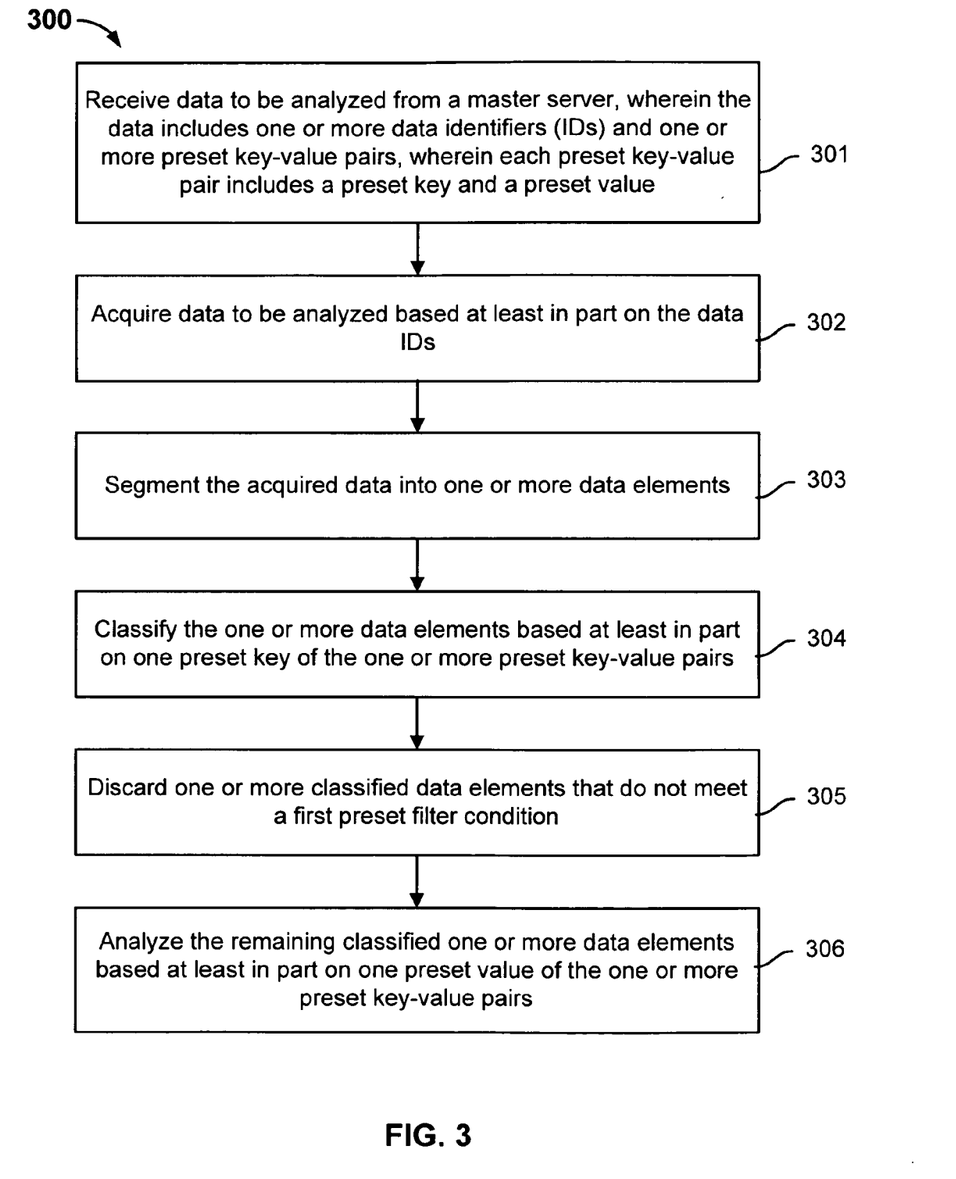
FIG. 3 is a flow diagram showing an embodiment of a process for data analysis.

FIG. 3 is a flow diagram showing an embodiment of a process for data analysis. Process 300 differs from process 200 by at least including an additional technique of filtering certain data after the data has been classified. In some embodiments, an administrator (e.g., of the data analysis system) configures which data is to be filtered out. In some embodiments, process 300 can be used as an alternative to process 200.

In the example, 301 to 304 correspond to 201 to 204.

At 301: data to be analyzed is received from a master server, wherein the data to be analyzed includes one or more data identifiers (IDs) and one or more preset key-value pairs, wherein each preset key-value pair includes a preset key and a preset value. In various embodiments, data to be analyzed is received at a slave server. In some embodiments, the data includes files. In some embodiments, a preset key defines the manner in which a slave server is to classify the data to be analyzed. In some embodiments, a preset value defines the manner in which a slave server is to analyze and process the classified data.

At 302: data to be analyzed is acquired based at least in part on the data IDs. In some embodiments, the slave server acquires the raw data that is to be analyzed from a data source based on the received data IDs. In some embodiments, the data elements included within the acquired data are segregated by partition IDs.

At 303: the acquired data is segmented into one or more data elements. In some embodiments, a slave server segments the acquired raw data into data elements based on the partition IDs.

A 304: the one or more data elements are classified based at least in part on one preset key of the one or more preset key-value pairs.

At 305: one or more classified data elements that do not meet a first preset filter condition are discarded.

For example, after classifying 10 sets of data based a preset key, a slave server classifies 7 of the sets of data together into a group and classifies the other 3 sets of data together into a second group. In the example, a filter condition has been configured (e.g., by an administrator). Due to the existence of the preset filter, 2 of the 7 sets of data in the first group that do not meet the filter condition are filtered out (e.g., discarded). As a result, the remaining 5 sets of data (which meet the filter condition and are therefore not discarded) are processed by the slave server based on the preset value.

For example, the first preset filter condition can include conditional expressions such as greater than, less than, not equal to, greater than or equal to, or less than or equal to a predetermined value. The first filter condition could specify a conditional expression for one particular data element within a set of data. The first filter condition is not limited to only those described and can be realized in any way to suit the needs of an administrator of the system.

At 306: the remaining classified one or more data elements are analyzed based at least in part on one preset value of the one or more preset key-value pairs. In some embodiments, the classified one or more data elements are analyzed by the slave server. In some embodiments, at least a subset of the analysis results that do not meet a second preset filter condition are filtered out (e.g., discarded). In some embodiments, the results of the analysis are sent to the master server. In some embodiments, the master server collects analysis results from more than one slave server. In some embodiments, the master server can merge and/or carry out further analysis on the analysis results collected from one or more slave servers.

In some embodiments, some results of the analysis that do not comply with a user configured condition are also discarded. For example, the administrator of the system can configure a second preset filter condition where the second preset filter condition is applied to the analysis results. The remaining analysis results (those that meet the second preset filter condition and are therefore not discarded) are sent to the master server for further processing, if any.

For example, the second preset filter condition can include conditional expressions such as greater than, less than, not equal to, greater than or equal to, or less than or equal to a predetermined value. The second preset filter condition could specify a conditional expression for one particular element within a set of analysis results. The second preset filter condition is not limited to only those described and can be realized in any way to suit the needs of an administrator of the system.

In some embodiments, in addition to performing analysis on the data, comparative analysis can be performed for one set of data and another set of data to generate some warnings, if appropriate. By performing comparative analysis, some problems associated with massive quantities of data can be avoided. In some embodiments, after the master server merges the analysis results received from one or more slave servers, it performs comparative analysis between the recently merged results with historical merged results and generates a warning signal based on the comparative analysis results if a warning condition is met. For example, system administrators may set various warning conditions based on their own use requirements.

Below are some examples of comparative analysis that can be performed by a master server:

One example of a comparative analysis includes comparing data merged today with data that was merged from the day before (or in some embodiments, data from the day before that is now merged). For example, the warning condition is met (and a warning signal is generated) when the data merged today is smaller than the data merged from the day before.

Another example of a comparative analysis includes comparing data merged today with data that was merged last week. For example, a warning condition can be based on the comparison between data merged today with data that was merged last week.

Another example of a comparative analysis includes comparing data merged today with data that was merged last month. For example, a warning condition can be based on the comparison between data merged today with data that was merged last month.

Another example of a comparative analysis includes comparing data merged today with data that was merged at a defined date. For example, a warning condition can be based on the comparison between data merged today with data that was merged at the defined date.

The comparative analyses described are merely examples. Any other form of comparative analysis can be used as well.

In some embodiments, the techniques described for process 300 can apply to a setup that includes a main thread module and one or more child thread modules (e.g., system 150). In such a setup, a main thread module can realize the functions of the master server and child thread modules can realize the functions of the slave servers. For example, after a child thread module classifies the acquired raw data based on the preset key: the child thread module can filter out the data that does not meet a first preset filter condition. Then, the child thread module can analyze the remaining data (that are not filtered out) based on the preset value. In some embodiments, the child thread module can also apply a second preset filter condition to the analysis results and filter out (e.g., discard) the results that do not meet the condition. The analysis results that meet the second preset filter condition (which are not discarded) are sent to the main thread module for further processing, if appropriate. After the main thread module merges the received analysis results, it can perform comparative analysis between the merged results with some historical merged results and generate a warning signal based on the comparative analysis results.

Figure 4:
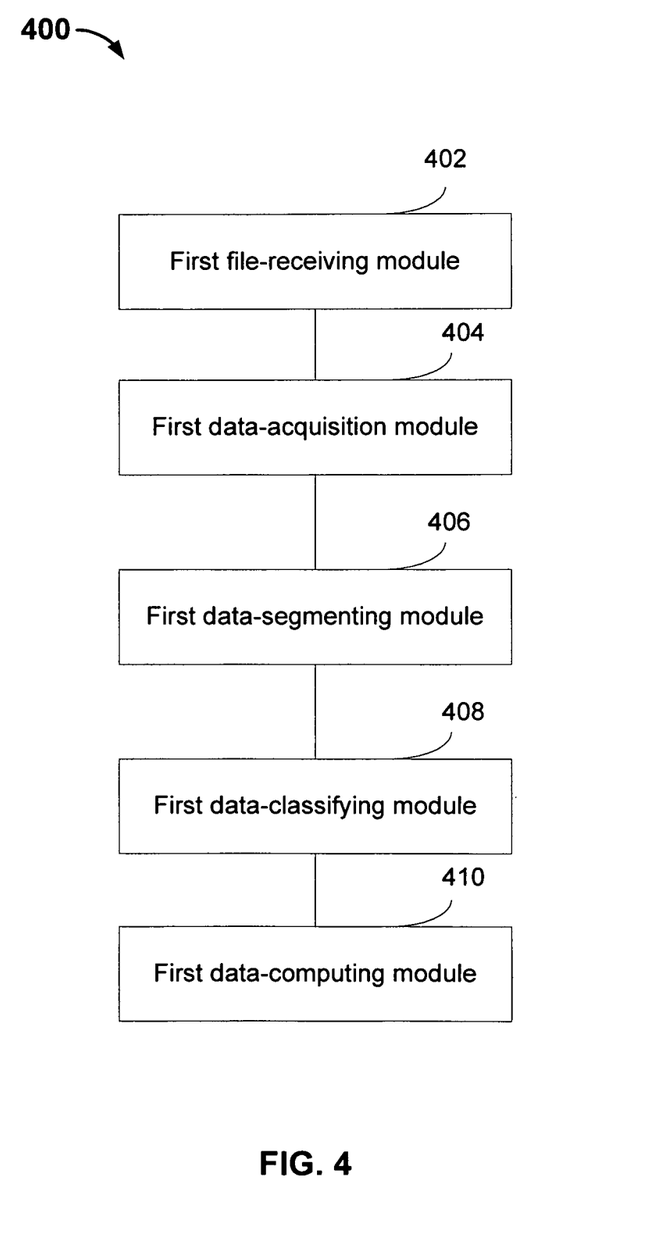
FIG. 4 is a diagram of an embodiment of a slave server in a system for data analysis that includes a master server and at least one slave server.

FIG. 4 is a diagram of an embodiment of a slave server in a system for data analysis that includes a master server and at least one slave server. In the example, slave server 400 comprises first file-receiving module 402, first data-acquisition module 402, first data-segmenting module 406, first data-classifying module 408, and data-computing module 410.

The modules can be implemented as software components executing on one or more processors, as hardware, such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

First file-receiving module 402 is configured to receive data to be analyzed (e.g., files) sent by the master server. In some embodiments, the data to be analyzed includes one or more data identifiers (IDs) and one or more preset key-value pairs, First data-acquisition module 404 is configured to acquire raw data that are to be analyzed from a data source based on the received data IDs. In some embodiments, the data elements included within the acquired data are segregated by partition IDs.

First data-segmenting module 406 is configured to segment the acquired data into one or more data elements. In some embodiments, the segmenting is based on the partition IDs.

First data-classifying module 408 is configured to classify the acquired raw data based on the preset key.

First data-computing module 410 is configured to analyze the classified raw data based on the preset value. In some embodiments, first data-computing module 410 is also configured to send the analysis results to the master server.

Figure 5:
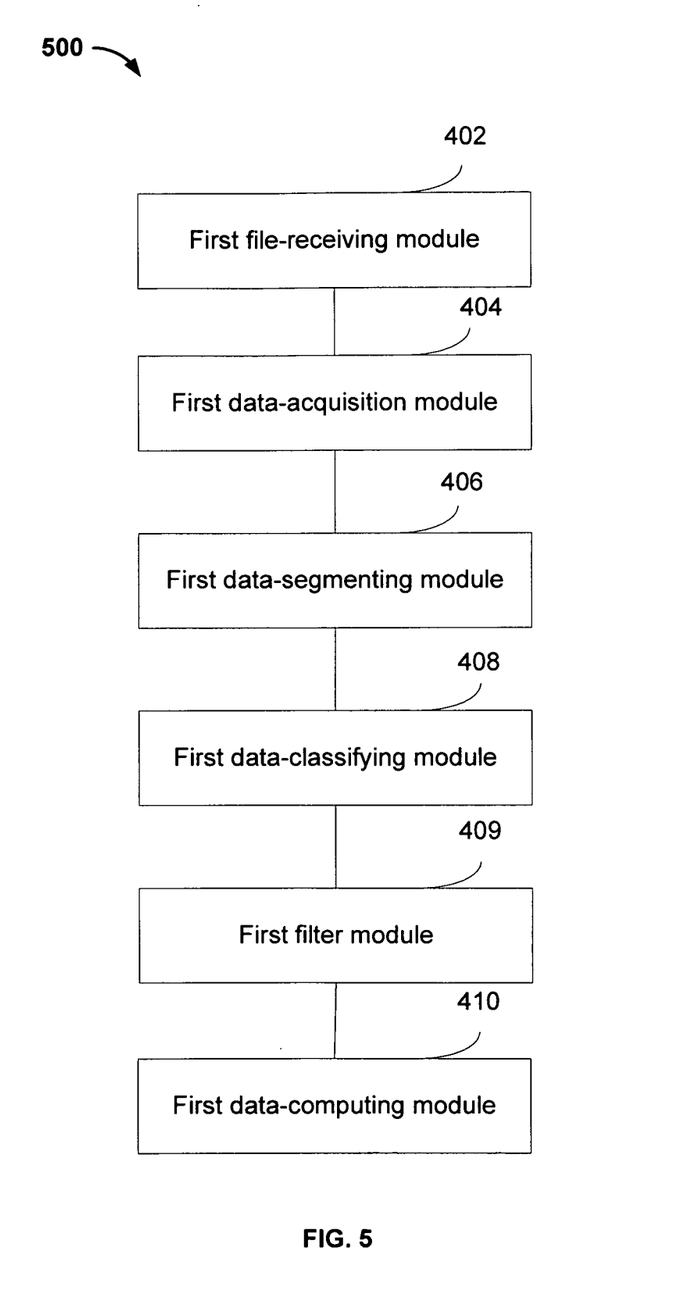
FIG. 5 is a diagram showing an embodiment of a slave server in a system for data analysis that includes a master server and at least one slave server.

FIG. 5 is a diagram showing an embodiment of a slave server in a system for data analysis that includes a master server and at least one slave server. In the example, slave server 500 is similar to slave server 400 except that slave server 500 includes the addition of a first filter module 409.

First filter module 409 is configured to filter out (e.g., discard) the classified raw data that does not meet a first preset filter condition. In the example, first data-computing module 410 is configured to analyze the remaining classified raw data (e.g., the data that meets the first preset filter condition and are therefore not discarded) based in the preset key. In some embodiments, first data-computing module 410 is also configured to send the analysis results to the master server.

Figure 6:
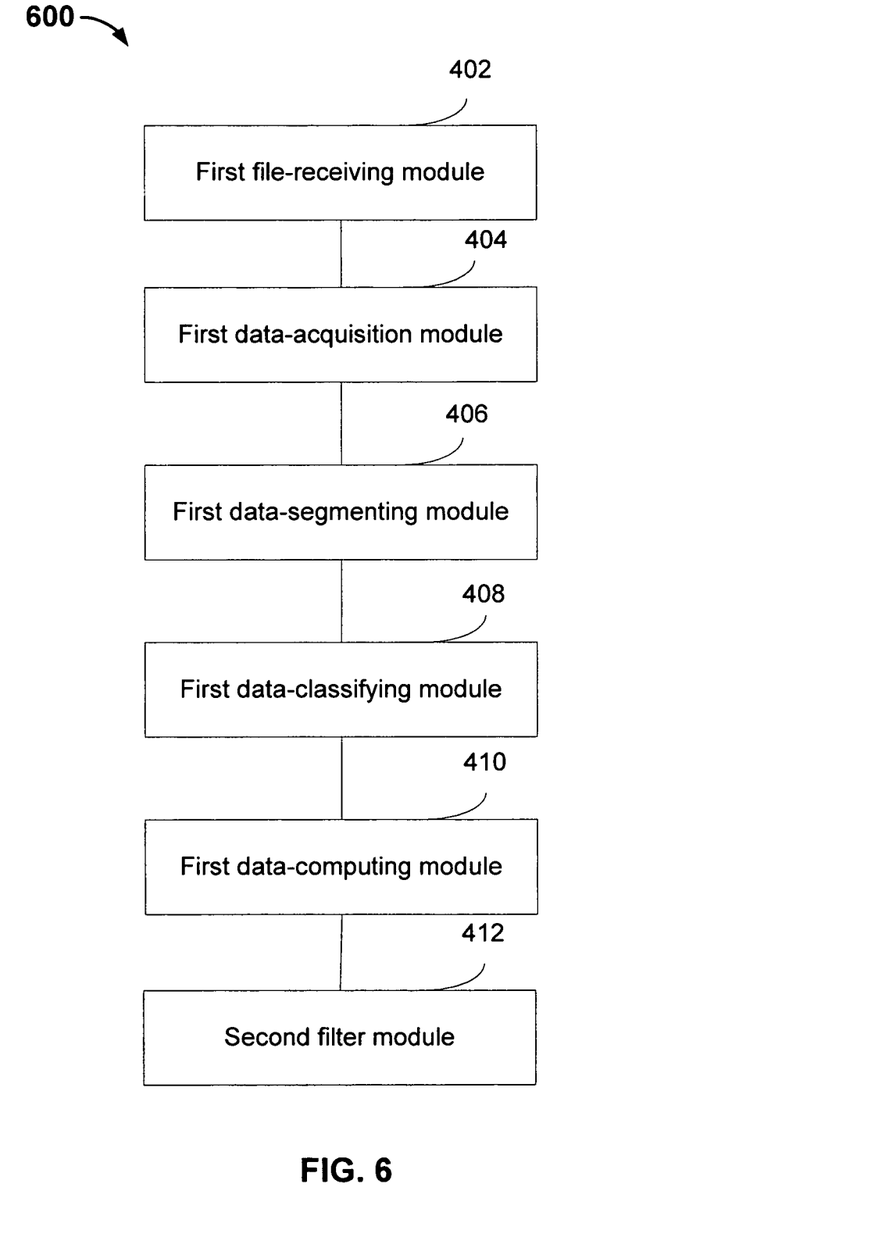
FIG. 6 is a diagram showing an embodiment of a slave server in a system for data analysis that includes a master server and at least one slave server.

FIG. 6 is a diagram showing an embodiment of a slave server in a system for data analysis that includes a master server and at least one slave server. In the example, slave server 600 is similar to slave server 400 except that slave server 600 includes the addition of a second filter module 412.

Second filter module 412 is configured to filter out (e.g., discard) analysis results that do not meet a second preset filter condition. In some embodiments, first data-computing module 410 is configured to send the remaining analysis results (e.g., the analysis results that meets the second preset filter condition and are therefore not discarded) are sent to the master server.

Figure 7:
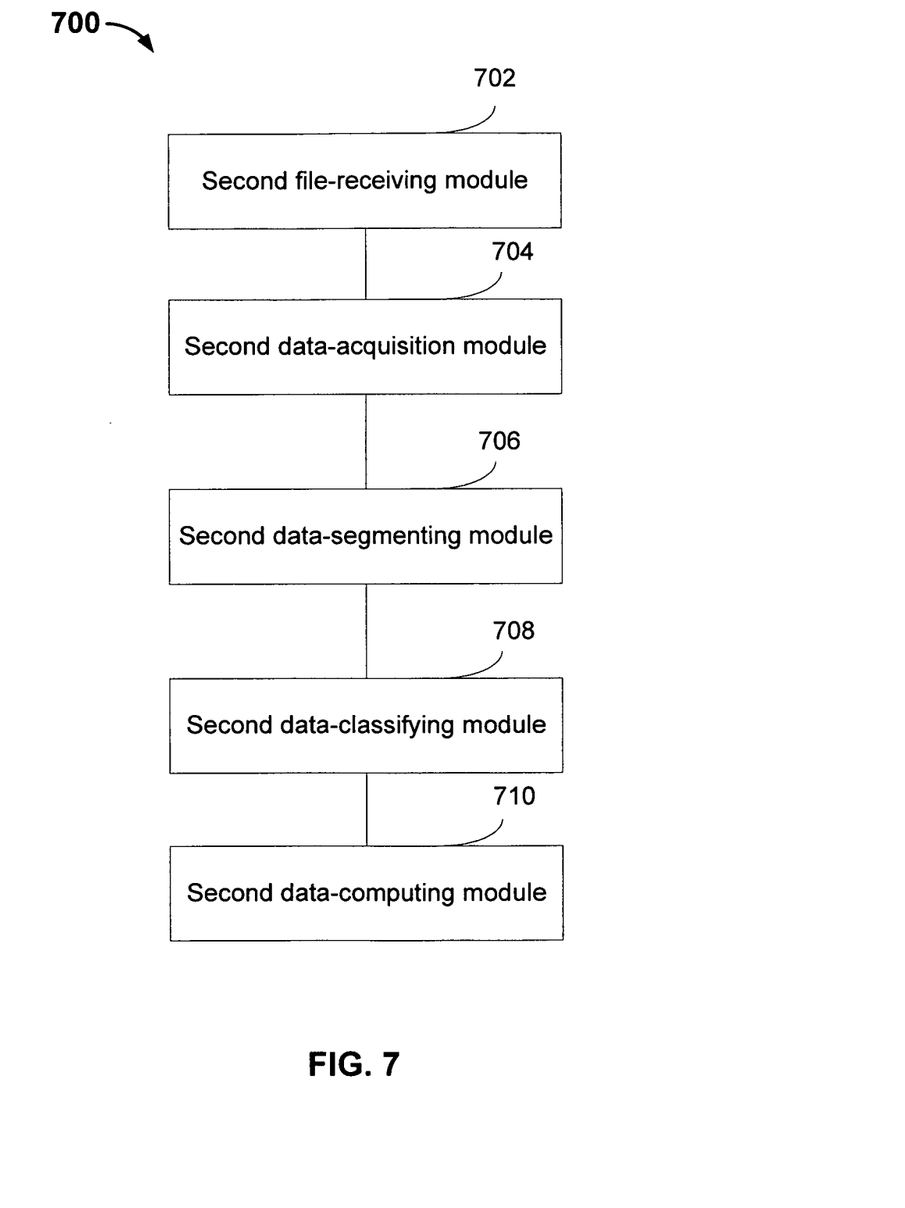
FIG. 7 is a diagram of an embodiment of a child thread module in a system including a main thread module and one or more child thread modules.

FIG. 7 is a diagram of an embodiment of a child thread module in a system including a main thread module and one or more child thread modules. In the example, a child thread module 70 includes second file-receiving module 702, second data-acquisition module 704, second data-segmenting module 706, second data-classifying module 708, and second data-computing module 710. In some embodiments, the modules are associated with child thread module are implemented on one device. As mentioned above, in some embodiments, a main thread module can perform the functions of the master server and each child thread module can be perform the functions of a slave server.

Second file-receiving module 702 is configured to receive data to be analyzed (e.g., files) sent by the main thread module. In some embodiments, the data to be analyzed includes one or more data identifiers (IDs) and one or more preset key-value pairs.

Second data-acquisition module 704 is configured to acquire raw data that are to be analyzed from a data source based on the received data IDs. In some embodiments, the data elements included within the acquired data are segregated by partition IDs.

Second data-segmenting module 706 is configured to segment the acquired data into one or more data elements. In some embodiments, the segmenting is based on the partition IDs.

Second data-classifying module 708 is configured to classify the acquired raw data based on the preset key.

Second data-computing module 710 is configured to analyze the classified raw data based on the preset value. In some embodiments, first data-computing module 410 is also configured to send the analysis results to the main thread module.

In some embodiments, child thread module 700 further includes a third filter module configured to filter out classified raw data that do not meet a first preset filter condition from the classified raw data. If the third filter module were included in child thread module 700, then second data-computing module 710 would be configured to analyze the remaining classified raw data (those that meet the preset filter condition and therefore are not filtered out) based on a preset value.

In some embodiments, child thread module 700 further includes a fourth filter module configured to filter out analysis results that do not meet a second preset filter condition. If the fourth filter module were included in child thread module 700, then second data-computing module 710 would be configured to send the remaining analysis results (those that meet the second preset filter condition and therefore are not filtered out) to the main thread module.

It needs to be explained that persons with ordinary skill in the art could understand how to implement all or part of the processes involved in the methods of the embodiments described above. They could use computer programs to instruct the relevant hardware to complete such processes. Said programs could be stored in readable storage media of a computer. When the program is running, it could include embodiments of all the methods described above. Said storage media could be magnetic disks, optical disks, read-only memory (ROM) or random access memory (RAM)

Data analysis methods, systems and servers provided by the present application have been described in detail above. This document has employed specific embodiments to expound the principles and forms of implementation of the present application. The above embodiment explanations are only meant to aid comprehension of the methods of the present application and of its core concepts. Moreover, a person with general skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of data analysis, comprising:
    receiving one or more data identifiers (IDs) associated with data to be analyzed;
    receiving a preset key-value pair, wherein the preset key-value pair includes a preset key and a preset value, wherein the preset key identifies at least in part a position of one or more data elements within a set of data to be analyzed, wherein the preset value identifies at least in part a function to be performed on one or more classified data elements;
    associating one or more preset keys with one or more corresponding aliases;
    acquiring data, using one or more processors, to be analyzed based at least in part on the data IDs, wherein the acquired data comprises one or more sets of data, wherein each of the one or more sets of data comprises one or more data elements;
    segmenting each of the one or more sets of data into corresponding one or more data elements;
    classifying the one or more sets of data into one or more groups of data based at least in part on the preset key, wherein classifying includes:
        comparing one or more data elements that are identified by the preset key within a first set of data to one or more data elements that are identified by the preset key within a second set of data: and
        sorting the first set of data and the second set of data into the one or more groups of data based at least in part on the comparison;
    analyzing the one or more groups of data based at least in part on the preset value to output a first set of analysis results, wherein analyzing the one or more groups of data includes performing a function specified by the preset value on each of the one or more groups of data;
    acquiring a second instance of data, the second instance of data comprising the one or more sets of data and one or more new sets of data, the second instance of data shifting a sequence of the data elements within the one or more sets of data;
    analyzing the second instance of data based at least in part on the one or more corresponding aliases and the preset value to output a second set of analysis results; and
    send at least one set of analysis results to a master server.

2. The method of claim 1, wherein the preset key indicates, at least in part, a manner in which the data to be analyzed is to be classified.

3. The method of claim 1, wherein the preset value indicates, at least in part, a manner in which classified data is to be analyzed.

4. The method of claim 1, wherein a data ID indicates data address information at a storage associated with the data to be analyzed.

5. The method of claim 1, wherein the acquired data includes one or more data elements, wherein a data element is segregated from another data element by a partition ID.

6. The method of claim 5, wherein the partition ID includes one or more of the following: a comma, a semicolon, and a colon.

7. The method of claim 1, wherein segmenting the acquired data into one or more data elements is based at least in part on one or more partition IDs.

8. The method of claim 1, further comprising discarding one or more classified data elements that do not meet a first preset filter condition.

9. The method of claim 8, wherein analyzing the remaining classified one or more data elements generates one or more analysis results and discarding at least one of the one or more sets of analysis results that do not meet a second preset filter condition.

10. The method of claim 1, wherein the data to be analyzed is received from a master server.

11. The method of claim 1, wherein the data to be analyzed is received from a main thread module.

12. A system for data analysis, comprising:
    a master server including a first processor configured to:

send one or more data identifiers (IDs) to be analyzed to at least one slave server;

send a preset key-value pair to the at least one slave saver, wherein the preset key-value pair includes a preset key and a preset value, wherein the preset key identifies at least in part a position of one or more data elements within a set of data to be analyzed, wherein the preset value identifies at least in part a function to be performed on one or more classified data elements; and receive analysis results from the at least one slave server;

the at least one slave server including a second processor configured to:

receive the one or more data IDs to be analyzed from the master server;

receive the preset key-value pair;

associate one or more preset keys with one or more corresponding aliases;

acquire data to be analyzed based at least in part on the data IDs, wherein the acquired data comprises one or more sets of data, wherein each of the one or more sets of data comprises one or more data elements;

segment each of the one or more sets of data into one or more corresponding data elements;

classify the one or more sets of data into one or more groups of data based at least in part on the preset key, wherein to classify includes to:

compare one or more data elements that are identified by the preset key within a first set of data to one or more data elements that are identified by the preset key within a second set of data: and sort the first set of data and the second set of data into the one or more groups of data based at least in part on the comparison;

analyze the one or more groups of data based at least in part on the preset value to output a first set of analysis results, wherein analyzing the one or more groups of data includes performing a function specified by the preset value on each of the one or more groups of data;

acquire a second instance of data, the second instance of data comprising the one or more sets of data and one or more new sets of data, the second instance of data shifting a sequence of the data elements within the one or more sets of data;

analyze the second instance of data based at least in part on the one or more corresponding aliases and the preset value to output a second set of analysis results; and send at least one set of analysis results to the master server;

a first memory coupled to the first processor and configured to provide the first processor with instructions; and a second memory coupled to the second processor and configured to provide the second processor with instructions.

13. The system of claim 12, wherein the preset key indicates, at least in part, a manner in which the data to be analyzed is to be classified.

14. The system of claim 12, wherein the preset value indicates, at least in part, a manner in which classified data is to be analyzed.

15. The system of claim 12, wherein the second processor is further configured to discard one or more classified data elements that do not meet a first preset filter condition.

16. The system of claim 15, wherein the second processor configured to analyze the remaining classified one or more data elements includes the second processor configured to generate one or more analysis results and discard at least one of the one or more set of analysis results that do not meet a second preset filter condition.

17. A computer program product for data analysis, the computer program product being embodied in a non-transitory computer readable medium and comprising computer instructions for:

receiving one or more data identifiers (IDs) associated with data to be analyzed;

receiving a preset key-value pair, wherein the preset key-value pair includes a preset key and a preset value, wherein the preset key identifies at least in part a position of one or more data elements within a set of data to be analyzed, wherein the preset value identifies at least in part a function to be performed on one or more classified data elements;

associating one or more preset keys with one or more corresponding aliases;

acquiring data to be analyzed based at least in part on the data IDs, wherein the acquired data comprises one or more sets of data, wherein each of the one or more sets of data comprises one or more data elements;

segmenting each of the one or more sets of data into corresponding one or more data elements;

classifying the one or more sets of data into one or more groups of data based at least in part on the preset key, wherein classifying includes:

compraring one or more data elements that are identified by the preset key within a first set of data to one or more data elements that are identified by the preset key within a second set of data: and sorting the first set of data and the second set of data into the one or more groups of data based at least in part on the comparison;

analyzing the one or more groups of data based at least in part on the preset value to output a first set of analysis results, wherein analyzing the one or more groups of data includes performing a function specified by the preset value on each of the one or more groups of data;

acquiring a second instance of data, the second instance of data comprising the one or more sets of data and one or more new sets of data, the second instance of data shifting a sequence of the data elements within the one or more sets of data;

analyzing the second instance of data based at least in part on the one or more corresponding aliases and the preset value to output a second set of analysis results; and send at least one set of analysis results to a master server.

* * * * *